United States Patent Office.

GUSTAV WENDT AND JOHANNES LEHMANN, OF BERLIN, GERMANY.

PROCESS OF MAKING SULFO-ACIDS OF ALIPHATIC CREOSOTESTERS.

SPECIFICATION forming part of Letters Patent No. 628,881, dated July 11, 1899.

Application filed December 28, 1897. Serial No. 664,080. (No specimens.)

*To all whom it may concern:*

Be it known that we, GUSTAV WENDT and JOHANNES LEHMANN, citizens of the Empire of Germany, residing in Berlin, Germany, have invented certain new and useful Improvements in Processes of Producing the Sulfoacids of Aliphatic Creosotesters, (for which we have obtained Letters Patent in Germany, No. 94,078, dated November 27, 1896,) of which the following is a specification.

The object of this invention is to provide a process for neutralizing the objectionable toxic properties of the valuable medicinal compounds known as "aliphatic creosotesters." This is accomplished by introducing into the compound a sulfo group, thus forming the corresponding sulfoacid, which does not possess toxic properties and may be freely used in medicine; and the invention consists in subjecting said esters under continuous stirring to the action of concentrated sulfuric acid, neutralizing the mixture by a suitable alkali, and separating the sulfoacids from the solution.

The aliphatic esters of creosote, as is well known, are useful medicinal compounds, but are not suitable for extended use on account of their toxic properties. To overcome this disadvantage, various methods have been suggested which accomplish this result by the introduction into the compound of various chemical groups which neutralize the objectionable toxic qualities.

We have ascertained that the capacity of these esters of being absorbed by the human organism is greatly increased by the introduction of sulfo groups, forming thereby the sulfoacids of the esters. In the salts obtained therefrom for the first time easily-soluble antiseptica for human use are produced, which combine a quick and effective action with an entire freedom from the objectionable toxic qualities of the esters. To form these sulfoacids, the ester is thoroughly mixed with concentrated sulfuric acid for a short time, with constant stirring to insure thorough mixing, and after standing for some time, usually about two hours, is then saturated with barium bicarbonate. For example, one volume acetylguaiacol (*Chem. Rep.* 14, p. 2019) is thoroughly mixed with one and one-half volumes of concentrated sulfuric acid for a short time and, after two hours' standing, saturated with barium bicarbonate. The yield obtained by sulfonation of the esters is nearly quantitative. After the reaction is completed the mass is mixed with water, neutralized with lime, filtered, and evaporated.

These new salts do not produce, either in concentrated solution or in powder form, any irritating effect, not even on the mucous membranes, and are entirely free from the pungent smell of creosot.

Having thus described our invention, we claim as new and desire to secure by Letters Patent—

1. The process herein described of producing the sulfoacids of aliphatic creosotesters, which consists in subjecting said esters under continuous stirring to the action of concentrated sulfuric acid, neutralizing the mixture by a suitable alkali, and separating the sulfoacids from the solution, substantially as set forth.

2. The process herein described of producing the sulfoacids of aliphatic creosotesters, which consists in subjecting said esters under continuous stirring to the action of concentrated sulfuric acid, at a temperature below 150° centigrade, allowing the mixture to stand for about two hours, neutralizing the same by a suitable alkali, and separating the sulfoacids from the solution, substantially as set forth.

In witness whereof we have hereunto signed our names in the presence of two subscribing witnesses.

GUSTAV WENDT.
JOH. LEHMANN.

Witnesses:
CHAS. H. DAY,
HENRY HASPER.